United States Patent
Keller et al.

(10) Patent No.: US 9,964,746 B2
(45) Date of Patent: May 8, 2018

(54) PASSIVE MICROMIRROR DEVICE FOR NON-IMAGING WIDE FIELD OF VIEW

(71) Applicant: RAYTHEON COMPANY, Waltham, MA (US)

(72) Inventors: Sean D. Keller, Tucson, AZ (US); Gerald P. Uyeno, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 252 days.

(21) Appl. No.: 14/873,460

(22) Filed: Oct. 2, 2015

(65) Prior Publication Data

US 2017/0097500 A1    Apr. 6, 2017

(51) Int. Cl.
| | |
|---|---|
| *H01J 40/14* | (2006.01) |
| *G02B 19/00* | (2006.01) |
| *G02B 26/08* | (2006.01) |
| *G01J 1/04* | (2006.01) |
| *G01J 1/44* | (2006.01) |

(52) U.S. Cl.
CPC ........ *G02B 19/0028* (2013.01); *G01J 1/0411* (2013.01); *G01J 1/0422* (2013.01); *G01J 1/0437* (2013.01); *G01J 1/44* (2013.01); *G02B 26/0833* (2013.01)

(58) Field of Classification Search
CPC ..... G02B 26/08; G02B 26/0833; G01J 1/0411
USPC ................. 250/216, 234; 359/850
See application file for complete search history.

(56) References Cited

U.S. PATENT DOCUMENTS

| | | | |
|---|---|---|---|
| 3,986,021 | A | 10/1976 | Hitchcock |
| 4,148,564 | A | 4/1979 | Devin et al. |
| 4,592,628 | A | 6/1986 | Altman et al. |
| 8,180,606 | B2 | 5/2012 | Hicks |
| 2009/0056790 | A1 | 3/2009 | Tian et al. |
| 2011/0032365 | A1 | 2/2011 | Yett |
| 2014/0253713 | A1* | 9/2014 | Zhai ........... H03K 21/38 348/80 |

* cited by examiner

*Primary Examiner* — Kevin Pyo
(74) *Attorney, Agent, or Firm* — Lando & Anastasi, LLP

(57) ABSTRACT

According to one aspect, embodiments herein provide a non-imaging optical system including a focusing optical element positioned within an input optical path to receive electromagnetic radiation, a micro-mirror array including a plurality of micro-mirror pixels positioned within the input optical path, individual micro-mirror pixels of the plurality of micro-mirror pixels being positioned to receive electromagnetic radiation from the focusing optical element and redirect electromagnetic radiation along a redirected optical path, a relay optical element positioned within the redirected optical path to receive and focus electromagnetic radiation from the micro-mirror array, and a single-pixel non-imaging detector positioned to receive electromagnetic radiation from the relay optical element.

20 Claims, 4 Drawing Sheets

PASSIVE MICROMIRROR DEVICE FOR NON-IMAGING WIDE FIELD OF VIEW

BACKGROUND

Non-imaging optics have a wide variety of applications throughout scientific, industrial, and military fields. In contrast to traditional imaging optics, non-imaging optics do not form an image of a source of electromagnetic radiation. Instead, non-imaging optics optimize the transfer of luminous power. For instance, non-imaging optics are often used in solar energy conversion systems.

In many optical systems it is desirable to have a wide field of view. For example, many telescopes have a large entrance aperture to permit imaging of a distant scene. This requires a large imaging detector or a short focal length such that light from the extremes of the field of view is focused on the detector. Use of a large detector increases the size, weight, power, and cost of the system. Use of a shorter focal length limits the optical system aperture diameter which limits the operating range of the system.

FIGS. 1A and 1B illustrate a known wide field of view non-imaging optical system. Electromagnetic radiation 100 propagating along an input optical path 102 is received at a focusing lens 104, and focused on a detector 106. FIG. 1B demonstrates a front view of the detector 106 shown in FIG. 1A. The radiation received along the input optical path 102 is focused at the center of the detector 106 to form an image 108. In contrast, radiation that is received at an off-set angle θ from the optical path 102 (radiation shown as line 110) is displaced from the center of the detector 106 and not viewable when the angle θ exceeds the acceptance angle of the focusing lens 104 and detector 106.

Conventionally, collecting more off-axis light is addressed by increasing the size of the detector until all (or most) of the incident electromagnetic radiation is viewable by the detector. However, such conventional approaches increase the weight and operational costs of the optical system, and are impractical in many applications. Other attempts to address this issue have suggested shortening the focal length of the optical system. However, such a solution would impact the characteristics of the optical elements and limit the operating range of the system. For instance, a known system having a 0.2 mm diameter detector may not image incident light if the incident light is as little as one degree off-axis of the optical axis. Further attempts have suggested decreasing the diameter of the aperture. However, such a solution would impact the ability to operate at long ranges. The same trades are performed for imaging and non-imaging optical systems alike.

SUMMARY OF THE INVENTION

Aspects and embodiments are directed to a non-imaging optical system and method. In particular, embodiments include a micro-mirror array including a plurality of micro-mirror pixels positioned to receive incident electromagnetic radiation from a large aperture optical element and redirect the electromagnetic radiation to a single-pixel detector.

Accordingly, various aspects and embodiments discussed herein permit collection of incident electromagnetic radiation over a wide field of view of the optical system, and in some embodiments at an angle of up to 10° offset relative to an input optical path. Despite large offset angles, in various embodiments, arrangements of individual micro-mirror pixels permit receipt of the re-directed electromagnetic radiation with a compact single-pixel detector.

At least one aspect described herein is directed to a non-imaging optical system. The non-imaging optical system may include a focusing optical element positioned within an input optical path to receive electromagnetic radiation, a micro-mirror array including a plurality of micro-mirror pixels positioned within the input optical path, individual micro-mirror pixels of the plurality of micro-mirror pixels being positioned to receive electromagnetic radiation from the focusing optical element and redirect electromagnetic radiation along a redirected optical path, a relay optical element positioned within the redirected optical path to receive and focus electromagnetic radiation from the micro-mirror array, and a single-pixel non-imaging detector positioned to receive electromagnetic radiation from the relay optical element.

According to one embodiment, the focusing optical element includes a large aperture focusing lens. In a further embodiment, the large aperture focusing lens is configured to receive electromagnetic radiation at an off-set angle relative to the input optical path. In one embodiment, the off-set angle is within a range of 0-10 degrees.

In one embodiment, individual micro-mirror pixels of the micro-mirror array are positioned in a two-dimensional arrangement according to at least one of a first tilt angle in a first direction, a second tilt angle in a second direction, a power factor in the first direction and the second direction, and an aspheric condition in the first direction and the second direction. In a further embodiment, the two-dimensional arrangement of the individual micro-mirror pixels includes a grid pattern.

According to one embodiment, individual micro-mirror pixels of the micro-mirror array are defined at least in part by a substantially curved surface. In one embodiment, the relay optical element is configured to focus the electromagnetic radiation at a substantially center point of the single-pixel non-imaging detector. According to one embodiment, the electromagnetic radiation includes visible light. In another embodiment, the electromagnetic radiation includes infrared radiation. In one embodiment, the single-pixel non-imaging detector is defined by a diameter less than 1 mm.

According to at least one aspect, provided is a method including receiving electromagnetic radiation at a focusing optical element positioned within an input optical path, receiving electromagnetic radiation from the focusing optical element at a micro-mirror array including a plurality of micro-mirror pixels positioned within the input optical path, redirecting electromagnetic radiation along a redirected optical path with at least one of the plurality of micro-mirror pixels, receiving electromagnetic radiation from the micro-mirror array at a relay optical element positioned within the redirected optical path, and receiving electromagnetic radiation from the relay optical element at a single-pixel non-imaging detector.

In one embodiment, receiving the electromagnetic radiation at the focusing optical element includes receiving the electromagnetic radiation at an off-set angle relative to the input optical path. In a further embodiment, the off-set angle is within a range of 0-10 degrees.

According to one embodiment, the method further includes tilting at least one micro-mirror pixel of the plurality of micro-mirror pixels at a first tilt angle in a first direction. In a further embodiment, the method further includes tilting the at least one micro-mirror pixel of the plurality of micro-mirror pixels at a second tilt angle in a second direction.

In one embodiment, the method further includes, positioning at least one micro-mirror pixel of the plurality of pixels relative to other micro-mirror pixels of the plurality of pixels according to at least one of a power factor and an aspheric condition. According to one embodiment, individual micro-mirror pixels of the micro-mirror array are defined at least in part by a substantially curved surface. According to one embodiment the method further includes focusing the electromagnetic radiation at a substantially center point of the single-pixel non-imaging detector. In one embodiment the electromagnetic radiation includes one of visible light and infrared radiation.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments discussed herein are directed to an optical system and method. Various embodiments include a micro-mirror array including a plurality of micro-mirror pixels positioned to direct incident electromagnetic radiation to a non-imaging optical detector. As used herein, electromagnetic radiation includes the flow of radiant energy formed by oscillating electric and magnetic disturbances, and for example, may include radio waves, microwaves, infrared radiation, visible light, ultraviolet radiation, X-rays, and gamma rays. In various embodiments, the optical system may include one or more optical elements, such as a focusing element and a relay optical element, positioned to focus and direct the electromagnetic radiation to the micro-mirror array and non-imaging detector.

Accordingly, various aspects and embodiments discussed herein provide a wide field of view optical system having a large aperture focusing element and a spatially compact (e.g., single-pixel) non-imaging detector. Such aspects and embodiments permit a reduced size, weight, power and cost (SWaP-C) optical system. While described herein as primarily including a single-pixel non-imaging detector, in various implementations the detector may include any number of pixels, any small detector, or any detector array.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1B:
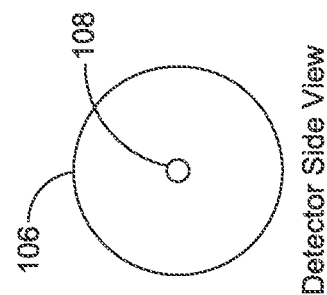
FIG. 1B is an example front view of the detector shown in FIG. 1A.
Figure 1A:
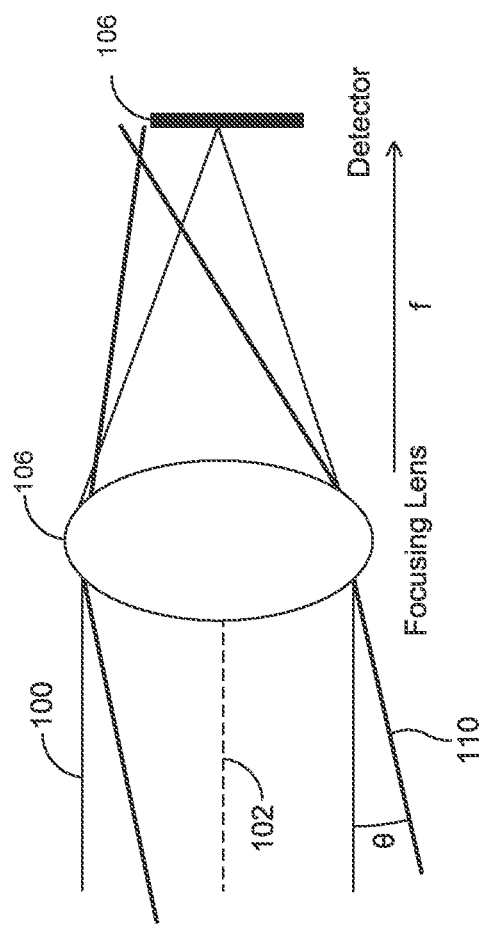
FIG. 1A is an example illustration of a known wide field of view non-imaging optical system having a compact imaging detector.
Figure 2:
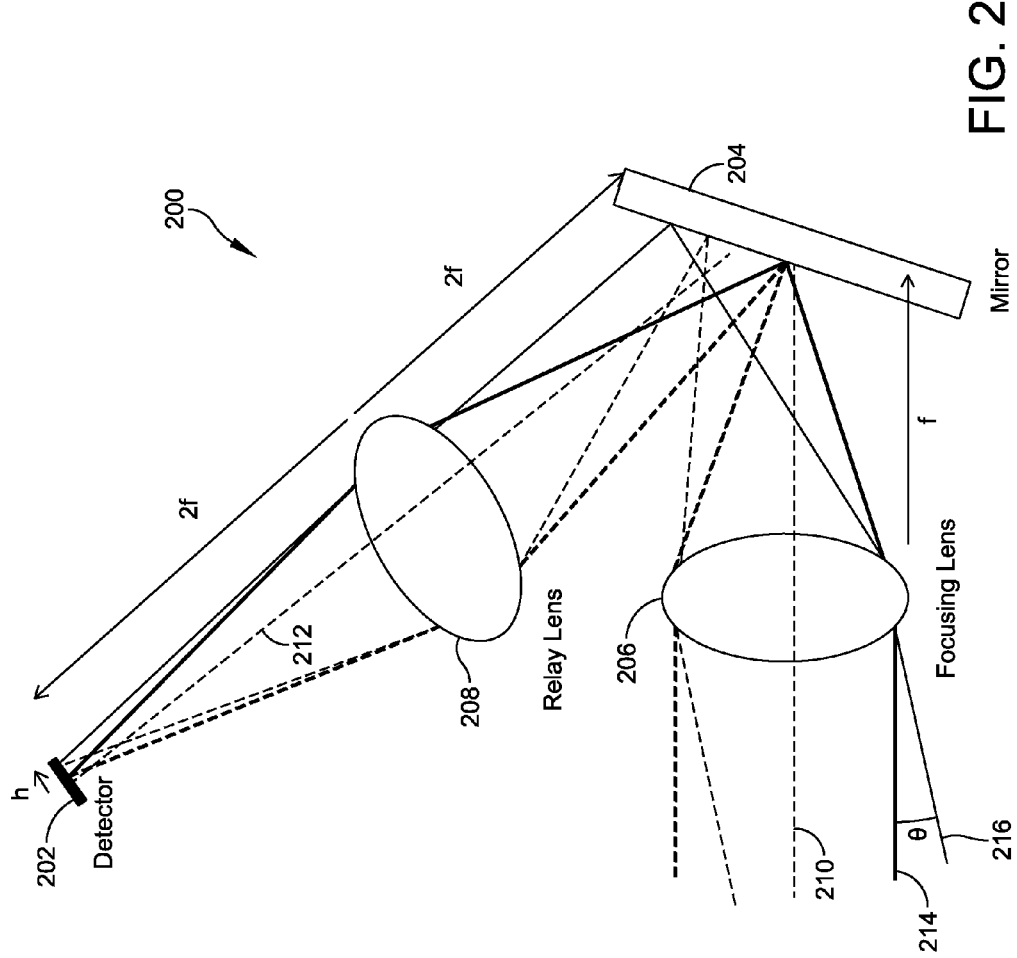
FIG. 2 is an example illustration of a wide field of view non-imaging optical system including a micro-mirror array according to an embodiment discussed herein.

FIG. 2 provides an illustration of a wide field of view non-imaging optical system including a micro-mirror array according to an embodiment discussed herein. The non-imaging optical system, generally indicated at 200, includes a non-imaging detector 202, a micro-mirror array 204, and one or more optical elements. For example, the optical elements may include a focusing optical element 206 and a relay optical element 208. FIG. 2 shows the focusing optical element 206 and the micro-mirror array 204 positioned within an input optical path 210, and the relay optical element 208 and the non-imaging detector 202 positioned within a re-directed optical path 212. In particular, the optical path 210 may be positioned based on an optical axis of the focusing lens 206 and the re-directed optical path 212 may be positioned based on an optical axis of the relay optical element 208. In various embodiments, the relay optical element 208 is interposed between the micro-mirror array 204 and the non-imaging detector 202 and the micro-mirror array 204 is interposed between the focusing optical element 206 and the relay optical element 208. While shown in FIG. 2 as single optical elements, in various further embodiments, the focusing optical element 206 and relay optical element 208 may include a plurality of optical elements, such as mirrors, lenses, or beam splitters. For example, the focusing optical element 206 may include an f-theta lens which produces a planar imaging plane and a low f-theta distortion. The f-theta lens of one example produces a uniform spot size at the micro-mirror array when an axis of the f-theta lens is substantially aligned to that of the micro-mirror array, increasing the efficiency at the detector 202.

In various embodiments, the focusing optical element 206 positioned within the input optical path 210 is positioned to receive electromagnetic radiation. In at least one embodiment, the focusing optical element 206 includes a large aperture optical element. Accordingly, electromagnetic radiation may be received along the input optical path (radiation shown as line 214), or at an off-set angle relative to the input optical path (radiation shown as line 216). For example, FIG. 2 shows the focusing optical element 206 receiving electromagnetic radiation at an off-set angle θ. In various embodiments, θ may range from 0-10 degrees, and in some embodiments, may range from 10-50 degrees (e.g., for a system including complex larger aperture lenses, such as an f-theta lens). In fact, when coupled with a panoramic focusing optical element, the maximum allowable θ may even increase from 50 degrees to 120+ degrees. Once received, the focusing optical element 206 transmits the received electromagnetic radiation to the micro-mirror array 204. In various embodiments, the focusing optical element 206 may substantially focus the received electromagnetic radiation. The transmitted electromagnetic radiation propagates along the input optical path 210 from the focusing optical element 206 to the micro-mirror array 204. In various embodiments the focusing optical element 206 includes a focusing lens. For example, the focusing lens may include any commercially available focusing lens, such as an Aspheric Condenser Lens or the f-theta lens discussed above.

In various embodiments, electromagnetic radiation propagating along the input optical path 210 is received by the micro-mirror array 204. The micro-mirror array 204 may include a plurality of micro-mirror pixels positioned to receive and re-direct electromagnetic radiation. As shown in FIG. 2, in several aspects and implementations the micro-mirror array 204 may be positioned at an angle relative to the input optical path 210. It is preferred to position the micro-mirror array 204 at a substantially normal angle relative to the input optical path 210; however, in further implementations it may be advantageous to position the micro-mirror array 204 at a predetermined angle. In one embodiment, positioning the micro-mirror array 204 at a substantially normal position relative to the input optical path 210 may reduce the effects of defocus and beam compression.

In one example, each individual micro-mirror pixel of the micro-mirror array 204 is composed of a substantially reflective material, or composed of a non-reflective substrate including a substantially reflective film disposed over at least one surface. For example, the micro-mirror pixels of one implementation may include a metal or plastic substrate having a reflective coating composed of gold, silver, nickel, or any other reflective coating designed to increase reflections at a desired wavelength. Reflective coatings may be deposited on individual micro-mirror pixels using electrostatic deposition, for example. Accordingly, in several embodiments individual pixels of the micro-mirror array 204 reflect incident electromagnetic radiation.

Figure 3B:
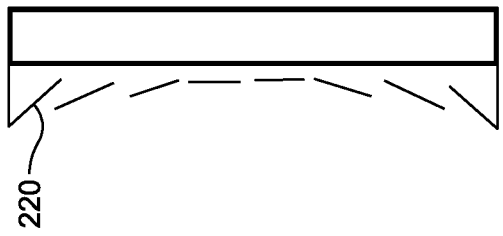
FIGS. 3A and 3B are example illustrations of one example of the micro-mirror array illustrated in FIG. 2, according to an embodiment discussed herein.
Figure 3A:
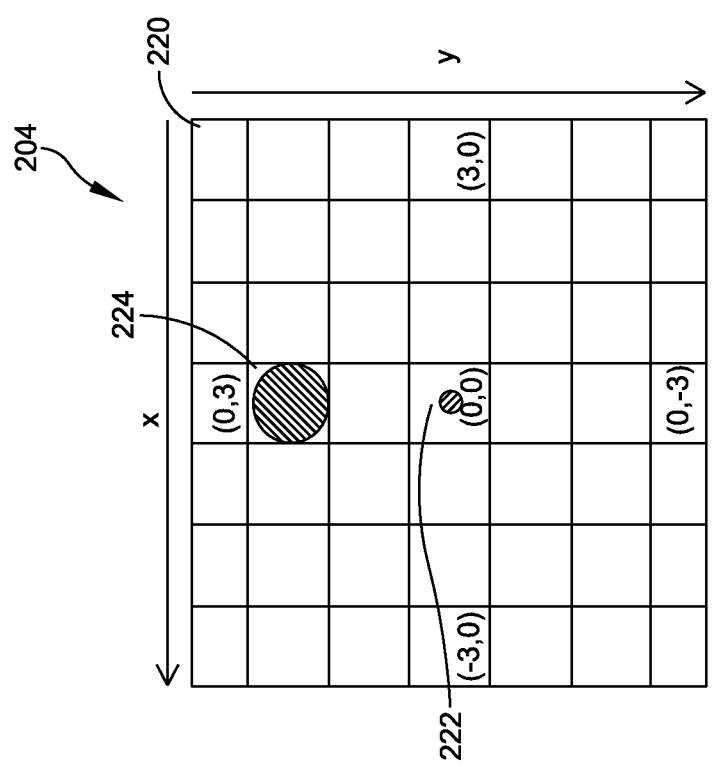

Turning briefly to FIGS. 3A and 3B, with continuing reference to FIG. 2, an example of the micro-mirror array 204 includes micro-mirror pixels 220 arranged in a two-dimensional grid-like pattern in a first direction along a length of the micro-mirror array 204 ("x-direction") and second direction along a height of the micro-mirror array 204 ("y-direction"). While shown arranged in a grid-like pattern of rows and columns, in various other embodiments, the plurality of micro-mirror pixels 220 may be arranged in any suitable pattern. For example, micro-mirror pixels 220 may be arranged in a diamond pattern, a substantially circular pattern, or a triangular pattern. Furthermore, individual pixels 220 may be uniform in shape, as shown in FIG. 3A, or non-uniform in shape. For example, in one embodiment, micro-mirror pixels 220 may increase in surface area as a distance from a center of the micro-mirror array 204 increases. While shown in FIG. 3A as including a 7×7 arrangement of 49 micro-mirror pixels, it is appreciated that in further embodiments, the micro-mirror array 204 may include any number of micro-mirror pixels 220.

FIG. 3B illustrates one cross section view of the micro-mirror array 204 through any one column of the micro-mirror array 204, according to various aspects and embodiments discussed herein. As shown, the individual micro-mirror pixels 220 may be tilted at a tilt angle relative to other micro-mirror pixels. In various embodiments, micro-mirror pixels 220 are tilted in the first direction (x-direction) and/or in the second direction (y-direction). In further embodiments, micro-mirror pixels 220 of the micro-mirror array 204 may be positioned according to a power factor and/or an aspheric condition. As used herein, aspheric condition refers to the profile of the surface of the micro-mirror pixel. For example, in one implementation micro-mirror pixels 220 may have an aspheric condition to reduce optical aberrations such as spherical aberration or astigmatisms. This increases the light collected by the relay lens 208. An overall shape of the micro-mirror array 204 may also follow a curve to reduce the total tilting of individual pixels 220. Such an implementation may further simplify manufacturing and production of the micro-mirror array 204. Further, individual micro-mirror pixels 220 may be defined by a substantially curved surface. In one example, each individual micro-mirror pixel 220 of the micro-mirror array 204 may be tilted at an angle relative to a center pixel. For example, in the first direction relative to a center pixel, the tilt angles of five micro-mirror pixels may include: 0, 0.25, 0.527, 1.527, and 2.64. The aspheric constants ($2^d$ order) may include: 0, $-5.1e^{-3}$, $-0.536$, $-0.536$, $-0.536$. The curvature may include: 0, $-0.011$, $-0.012$, $-0.012$, and $-0.016$. In the second direction, relative to a center pixel, the tilt angle for each individual pixel 220 may be the same. While in various embodiments the power factor, aspheric condition, and curved surface for each pixel 220 may be the same in the first and second direction, in further embodiments, each pixel 200 may have a different power factor, aspheric condition, or curvature in the second direction.

In several embodiments, electromagnetic radiation received by the micro-mirror array 204 is received by one or more micro-mirror pixels 220. Electromagnetic radiation received at various off-set angles is received at different spatial locations on the micro-mirror array 204. FIG. 3A illustrates electromagnetic radiation propagating along the input optical path 210 as being received at a substantially center pixel 222 of the micro-mirror array 204, and electromagnetic radiation propagating at an off-set angle from the input optical path 210 as being received at a pixel 224 off-set from the center of the micro-mirror array 204. Individual pixels 220 of the micro-mirror array 204 are positioned to re-direct electromagnetic radiation along the re-directed optical path 212. As shown in FIG. 3A, electromagnetic radiation may be received and re-directed simultaneously from various pixels of the micro-mirror array 204. Referring to FIG. 2, the micro-mirror array 204 is shown as being positioned at a distance f from the focusing optical element 206 and at a distance of 2f from the relay optical element 208. These distances of f represent the focal lengths of the respective optical elements and provide a rough alignment for first-order optics. In practice, the separation of the elements may vary to maximize energy on the detector 202. In various embodiments, the distance between the micromirror array 204 and the relay optical element 208 is twice the distance between the micro-mirror array 204 and the focusing optical element 206.

In various embodiments, electromagnetic radiation propagating along the redirected optical path 212 is received by the relay optical element 208. The angle between the input optical path 210 and the re-directed optical path 212 may be determined based on an angle of the mirror 204 according to the law of reflection, and the tilt angle of a substantially center pixel. In various embodiments, the relay optical element 208 includes a relay lens. For example, the relay lens may include any commercially available lens. Once received, the relay optical element 208 transmits the received electromagnetic radiation to the single-pixel non-imaging detector 202. In various embodiments, the relay optical element 208 may substantially focus the received electromagnetic radiation. In further embodiments, the relay optical element 208 is configured to focus the electromagnetic radiation at a substantially center point of the single-pixel non-imaging detector 202. FIG. 2 shows the relay optical element 208 being positioned at a distance 2f from the non-imaging detector 202, twice the distance f between the micro-mirror array 204 and the focusing optical element 206.

As illustrated in FIG. 2, the system 200 may include a non-imaging detector positioned to receive electromagnetic radiation, for instance, visible light or infrared radiation. As discussed herein, in various embodiments the non-imaging detector 202 may include a single-pixel non-imaging detector. In one embodiment, and in contrast to traditional wide field of view non-imaging optical systems, the non-imaging detector 202 may have a total active area of 200 μm. Such a size not only reduces the size and weight of the optical system, it also reduces operational costs, such as power consumption. In FIG. 2, the height of the non-imaging detector 202 is represented by "h", which may be 100 μm for a 200 μm diameter single-pixel detector. In one embodiment the non-imaging detector 202 may include an Indium Gallium Arsenide (InGaAs) single-pixel avalanche photodetector (APD). However, in further embodiments other appropriate non-imaging detectors may be used.

As shown in FIG. 2, despite receiving electromagnetic radiation at an offset angle of θ, the optical system 200 permits detection of electromagnetic radiation with a spatially compact single-pixel non-imaging detector. In various embodiments, the optical system permits detection of electromagnetic radiation in a field of view of at least 10 degrees, and in some instances may permit detection in a field of view of up to 120 degrees. Various embodiments discussed herein may be used in various wide field of view scientific, industrial, and military optical systems such as Laser Detection and Ranging (LADAR) systems.

Figure 4:
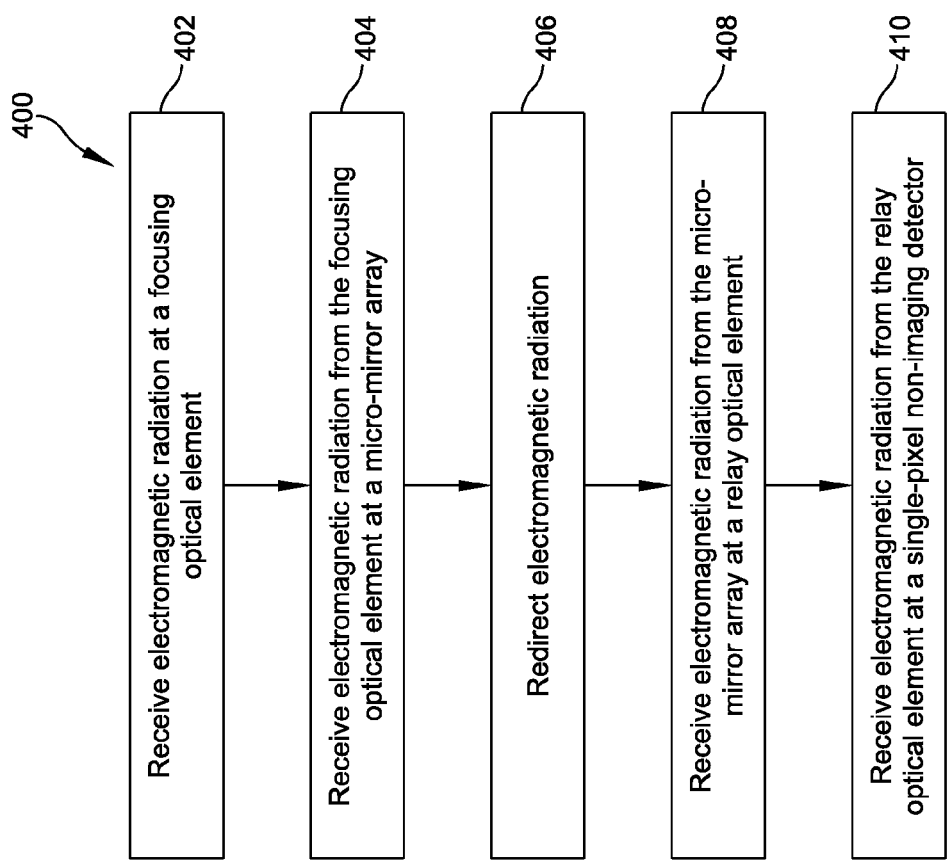
FIG. 4 is an illustrative process flow for directing electromagnetic radiation according to an embodiment discussed herein.

As discussed above, several embodiments perform processes that receive and detect electromagnetic radiation. In some embodiments, these processes are executed by an optical system including a single-pixel non-imaging detector, such as the system 200 described above with reference to FIGS. 2, 3A, and 3B. One example of such a process is illustrated in FIG. 4. According to this example, the process 400 may include the acts of receiving electromagnetic radiation at a focusing optical element, receiving electromagnetic radiation from the focusing optical element at a micro-mirror array, receiving electromagnetic radiation from the micro-mirror array at a relay optical element, and receiving electromagnetic radiation from the relay optical element at a single-pixel non-imaging detector.

In act 402, the process may include receiving electromagnetic radiation at a focusing optical element positioned within an input optical path. In various embodiments, electromagnetic radiation is received along an input optical path at the focusing optical element; however, in several other embodiments electromagnetic radiation is received at an offset-angle relative to the input optical path. For example, the off-set angle may be within a range of 0-10 degrees. As discussed herein, electromagnetic radiation may include visible light and/or infrared radiation, among light of other wavelengths.

In act 404, the process may include receiving electromagnetic radiation from the focusing optical element at a micro-mirror array including a plurality of micro-mirror pixels positioned within the input optical path. In act 406, the process may include redirecting electromagnetic radiation along a redirected optical path with at least one of the plurality of micro-mirror pixels. As discussed above, micro-mirror pixels may include at least one reflective surface positioned to redirect electromagnetic radiation. In further embodiments, the process 400 may include tilting at least one micro-mirror pixel of the plurality of micro-mirror pixels at a first tilt angle in a first direction and/or at a second tilt angle in a second direction. For example, the first direction may be substantially perpendicular to the second direction, as shown in FIG. 2 (e.g., x-direction along the length of the micro-mirror array 204 and y-direction along the height of the micro-mirror array).

The first and second tilt angles adjust the direction of the re-directed electromagnetic radiation. Accordingly, the first and second tilt angles may be pre-adjusted based on the offset angle of the electromagnetic radiation. In further embodiments, the process 400 may include positioning micro-mirror pixels of the plurality according to at least one of a power factor or an aspheric condition. Similarly, the power factor and aspheric condition of one or more micro-mirror pixels of the micro-mirror array may be selected based on the off-set angle of incident electromagnetic radiation or a range of off-set angles.

In act 408, the process may include receiving electromagnetic radiation from the micro-mirror array at a relay optical element positioned within the redirected optical path. In act 410, the process may include receiving electromagnetic radiation from the relay optical element at a single-pixel non-imaging detector. As discussed above, the relay optical element may include a relay lens positioned to focus electromagnetic radiation on the single-pixel non-imaging detector. Accordingly, in further embodiments, the process may include focusing the electromagnetic radiation at a substantially center point of the single-pixel non-imaging detector.

Aspects and embodiments discussed herein are directed to an optical system and method. One embodiment includes a micro-mirror array including a plurality of micro-mirror pixels positioned to direct incident electromagnetic radiation to a non-imaging optical detector. In various embodiments, the optical system may also include one or more optical elements, such as a focusing element and a relay optical element, positioned to focus and direct the electromagnetic radiation to the micro-mirror array and non-imaging detector. In contrast to conventional non-imaging optical systems, such an embodiment permits a wide field of view and large aperture despite the inclusion of a detector having a small active area. It is appreciated that a compact detector reduces the weight and dimensions of the optical system, in addition to operational costs, such as power consumption, thereby permitting a reduced SWaP-C optical system.

Additionally, the one or more embodiments as described herein may be executed conjunctively or adjunctively with additional embodiments. Indeed, various embodiments may be combined as necessary to meet the demands of various applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A non-imaging optical system comprising:
   a focusing optical element positioned within an input optical path to receive electromagnetic radiation;
   a micro-mirror array including a plurality of micro-mirror pixels positioned within the input optical path, individual micro-mirror pixels of the plurality of micro-mirror pixels being positioned to receive electromagnetic radiation from the focusing optical element and redirect electromagnetic radiation along a redirected optical path, wherein individual micro-mirror pixels of the micro-mirror array are each positioned at a tilt relative to each other such that a shape of the micro-mirror array is curved;
   a relay optical element positioned within the redirected optical path to receive and focus electromagnetic radiation from the micro-mirror array; and
   a single-pixel non-imaging detector positioned to receive electromagnetic radiation from the relay optical element.

2. The non-imaging optical system of claim 1, wherein the focusing optical element includes a large aperture focusing lens.

3. The non-imaging optical system of claim 2, wherein the large aperture focusing lens is configured to receive electromagnetic radiation at an off-set angle relative to the input optical path.

4. The non-imaging optical system of claim 3, wherein the off-set angle is within a range of 0-10 degrees.

5. The non-imaging optical system of claim 1, wherein the individual micro-mirror pixels of the micro-mirror array are positioned in a two-dimensional arrangement and tilted according to a first tilt angle in a first direction and a second tilt angle in a second direction.

6. The non-imaging optical system of claim 5, wherein the two-dimensional arrangement of the individual micro-mirror pixels includes a grid pattern.

7. The non-imaging optical system of claim 1, wherein a reflective surface of the individual micro-mirror pixels of the micro-mirror array are defined at least in part by a substantially curved surface.

8. The non-imaging optical system of claim 1, wherein the relay optical element is configured to focus the electromagnetic radiation at a substantially center point of the single-pixel non-imaging detector.

9. The non-imaging optical system of claim 1, wherein the electromagnetic radiation includes visible light.

10. The non-imaging optical system of claim 1, wherein the electromagnetic radiation includes infrared radiation.

11. The non-imaging optical system of claim 1, wherein the single-pixel non-imaging detector is defined by a diameter less than 1 mm.

12. A method comprising:
    positioning individual micro-mirror pixels of a plurality of micro-mirror pixels of a micro-mirror array at a tilt relative to each of the other micro-mirror pixels such that a shape of the micro-mirror array is curved;
    receiving electromagnetic radiation at a focusing optical element positioned within an input optical path;
    receiving electromagnetic radiation from the focusing optical element at the micro-mirror array including the plurality of micro-mirror pixels, the plurality of micro-mirror pixels being positioned within the input optical path;
    redirecting electromagnetic radiation along a redirected optical path with at least one of the plurality of micro-mirror pixels;
    receiving electromagnetic radiation from the micro-mirror array at a relay optical element positioned within the redirected optical path; and
    receiving electromagnetic radiation from the relay optical element at a single-pixel non-imaging detector.

13. The method of claim 12, wherein receiving the electromagnetic radiation at the focusing optical element includes receiving the electromagnetic radiation at an off-set angle relative to the input optical path.

14. The method of claim 13, wherein the off-set angle is within a range of 0-10 degrees.

15. The method of claim 12, wherein positioning the individual micro-mirror pixels of the plurality of micro-mirror pixels includes tilting at least a first micro-mirror pixel of the plurality of micro-mirror pixels at a first tilt angle in a first direction along a length of the micro-mirror array.

16. The method of claim 15, wherein positioning the individual micro-mirror pixels of the plurality of micro-mirror pixels includes tilting the at least first micro-mirror pixel of the plurality of micro-mirror pixels at a second tilt angle in a second direction along a height of the micro-mirror array.

17. The method of claim 12, further comprising positioning at least a first micro-mirror pixel of the plurality of pixels relative to other micro-mirror pixels of the plurality of pixels according to at least one of a power factor and an aspheric condition.

18. The method of claim 12, wherein a reflective surface of the individual micro-mirror pixels of the micro-mirror array are defined at least in part by a substantially curved surface.

19. The method of claim 12, further comprising focusing the electromagnetic radiation at a substantially center point of the single-pixel non-imaging detector.

20. The method of claim 12, wherein the electromagnetic radiation includes one of visible light and infrared radiation.

* * * * *